Patented Jan. 1, 1946

2,392,067

UNITED STATES PATENT OFFICE 2,392,067

INSECTICIDES

Herbert Schotte, Berlin-Charlottenburg, and Robert Ebert, Berlin-Halensee, Germany, assignors to Sherka Chemical Co. Inc., Bloomfield, N. J., a corporation of New York No Drawing. Application May 3, 1941, Serial No. 391,724. In Germany May 10, 1940

14 Claims. (Cl. 167—33)

This invention relates to insecticides and more particularly to insecticides and insecticidal compositions comprising certain halogenated nitrocarbazols.

Nitrated compounds which at the same time may also be chlorinated have already been used for the extermination of insects, as, e. g., dinitro cresol, nitro chlorophenol, nitrothiophen, tetranitro diphenyl oxide and others. These compounds, however, did not come up to expectations with regard to their insecticidal activity and showed other disadvantages as damage on plants, strong coloring effects etc.

Now we have found that certain halogenated nitro carbazols or their salts represent excellent insecticides, which in their activity even surpass arsenic. These compounds are the dihalogenated 3,4-dinitro carbazols. They may be used in the pure state or as raw products in mixture with less effective or even ineffective isomers. For applying the same to practical use they may be intimately mixed with wetting agents, fillers, agents capable of improving the adhesiveness, other insecticides and the like. Also their salts, for instance, their potassium, magnesium, calcium, and the like salts may be used. They are obtained by means of the corresponding metal hydroxides. In the appended claims, the wetting agents, fillers, agents for improving adhesiveness, etc. will be referred to generically as "insecticide adjuvants."

These compounds may be obtained in the following manner: On treating carbazol with nitric acid according to German Patent 46,438, an isomeric mixture of dinitrocarbazols is formed, melting as raw product between 310 and 350° C., wherefrom 3,6-dinitrocarbazol of the M. P. 365–67° C. can be separated by means of pyridine or nitrobenzene. On introducing two atoms of chlorine into this nitro compound a mixture of isomers is obtained the analysis of which corresponds to a dichloro dinitro carbazol, said mixture melting at about 245° C. The pure 3,6-dinitrocarbazol of M. P. 365–67° C. is also capable of absorbing two atoms of chlorine to form 1,8-dichloro-3,6-dinitro-carbazol of M. P. 285° C. Compare, for instance, P. Ziersch Berichte, vol. 42, page 3799 (1909). The corresponding dibromo-dinitro carbazols are obtained by replacing chlorine in this reaction with bromine.

The crude dichloro-dinitro carbazol shows a high activity when used against various species of insects. A 0.1–0.4% suspension thereof kills, for instance, Liparis dispar, Liparis monacha, Clysia ambiguella, and Melolontha vulgaris. In higher concentrations the killing of the insects proceeds very quickly, usually even within 24 hours. The bromine derivative possesses about the same insecticidal properties.

On separating the crude products into their isomers it has been recognized that the lower melting isomers possess a comparatively good activity, which, however, is rather specific, as they act, for instance. especially against Liparis dispar, Clysia ambiguella, Liparis monacha etc. while they do not suffice when applied on Dixipus morosus and Bombyx mori, which are frequent test insects in laboratories.

Compared with the above identified products the pure 1,8-dichloro-3,6-dinitrocarbazol of M. P. 285° C. and the corresponding bromine derivative show a rather generic activity on all the hitherto tested insects as, for example, Liparis dispar (Lymantria)
Liparis monacha
Euproctis chrysorrhoea
Pieris brassicae
Phalera bucephala
Vanessa urticae
Vanessa io
Bombyx mori
Clysia ambiguella
Polychrosis botrana
Cydia pomonella
Dixipus morosus
Malacosoma neustria
Melolontha vulgaris
Athalia spinarum
Chrysomelides, etc.

Likewise, the crude mixture of isomers, which contains mainly the 1,8-dichloro-3,6-dinitro carbazol, shows a good effect on all the above mentioned insects; since, however, the isomers of lower melting point have not the same activity as the pure 1,8-dihalogeno-3,6-dinitro-carbazols, they must be applied in a somewhat higher concentration than the latter compounds.

The application of the compounds as they may be obtained according to this invention, does not at all cause any damage on plants, even on rather sensitive ones. The compounds are furthermore practically non-toxic for warm-blooded animals; for their toxicity is less than that of salicylic acid.

The manner of application is not limited to the use of spraying solutions. The compounds may also be used as dusting agents as well as for the manufacture of baits.

The insecticidal effect of the described dihalogeno dinitrocarbazols and their salts respectively is the more surprising as a large series of related compounds of this group are completely ineffective or at least without any practical importance. Thus, the following carbazol derivatives, for instance, are without any activity:

3,6-dinitrocarbazol
3,6-dinitro-N-methyl-carbazol
1,6,8-trinitro-3-methyl carbazol
Tetranitro-N-methylcarbazol
Tetrachlorocarbazol
Tetrabromocarbazol and the like.

The following examples serve to illustrate the invention without, however, limiting the same to them.

Example 1

2.5 parts of a mixture of isomers of dichloro-3,6-dinitrocarbazol, obtained, for instance, according to P. Ziersch Berichte, vol. 42, page 3799 (1909), are intimately mixed with 5 parts of lauryl alcoholate sulfonate as wetting agent and 70 parts of kaolin. The mixture is applied in a 1% suspension in water.

Example 2

10 parts of 1,8-dichloro-3,6-dinitrocarbazol of M. P. about 285° C. are intimately mixed with 90 parts of talc and used as dusting agent.

Example 3

20 parts of 1,8-dibromo-3,6-dinitrocarbazol, 70 parts of bran, and 10 parts of molasses are intimately mixed and stirred with water to make a paste, which is scattered over the area to be treated as a bait.

Of course, many changes and variations in the proportions used, the adjuvants employed and the like may be made by those skilled in the art in accordance with the principles set forth herein and in the claims annexed hereto.

What we claim is:

1. An insecticidal composition containing a dihalogenated 3,6-dinitrocarbazol and a wetting agent.
2. An insecticidal composition containing a dichloro-3,6-dinitrocarbazol and a wetting agent.
3. An insecticidal composition, comprising a dihalogenated 3,6-dinitro carbazol, a wetting agent and a filler.
4. An insecticidal composition, comprising a dihalogenated 3,6-dinitrocarbazol, a wetting agent, a filler, and an agent capable of improving the adhesiveness of said composition.
5. An insecticidal composition, comprising a dichloro-3,6-dinitrocarbazol, a wetting agent, and a filler.
6. An insecticidal composition, comprising 1,8-dichloro-3,6-dinitrocarbazol, a wetting agent, and a filler.
7. An insecticidal composition, comprising 1,8-dichloro-3,6-dinitrocarbazol, a wetting agent, a filler, and an agent capable of improving the adhesiveness of said composition.
8. An insecticidal spraying solution, comprising a suspension of a dihalogenated 3,6-dinitrocarbazol in water.
9. An insecticidal spraying solution, comprising a suspension of 1,8-dichloro-3,6-dinitro carbazol in water.
10. An insecticidal dusting agent, comprising a mixture of a dihalogenated 3,6-dinitrocarbazol and a filler.
11. An insecticidal dusting agent, comprising a mixture of 1,8-dichloro-3,6-dinitro carbazol and a filler.
12. An insecticidal composition, comprising a dihalogenated 3,6-dinitro carbazol and a bait.
13. An insecticidal composition, comprising 1,8-dichloro-3,6-dinitro carbazol and a bait.
14. An insecticide composition containing a dihalogenated dinitro carbazol and a filler.

ROBERT EBERT.
HERBERT SCHOTTE.